Patented Jan. 30, 1951

2,539,675

UNITED STATES PATENT OFFICE 2,539,675

MODIFICATION OF THE PROPERTIES OF UNSATURATED CONJUNCT POLYMERS

Louis Schmerling, Riverside, Ill., assignor to Universal Oil Products Company, Chicago, Ill., a corporation of Delaware No Drawing. Application June 16, 1949, Serial No. 99,579

6 Claims. (Cl. 260—666)

This invention relates to a process for modifying the physical, chemical and certain other characteristics of polyolefinic, cyclic hydrocarbons containing conjugated as well as non-conjugated unsaturation, said hydrocarbons, comprising the primary charging stock in the present process, being referred to as unsaturated conjunct polymers and hereinafter more specifically defined. The invention more particularly concerns the reaction of said unsaturated hydrocarbons with formic acid at specified reaction conditions whereby a product having less color and fewer unsaturated bonds particularly of the conjugated variety than the initial starting material is obtained, the resulting hydrocarbon product having more desirable properties as a drying oil component in the formulation of paints, varnishes, and lacquer compositions in eliminating the tendency of the unmodified hydrocarbon drying oil to embrittle upon oxidative drying and discolor upon ageing.

It is now known that said unsaturated, cyclic hydrocarbons, containing conjugated and non-conjugated unsaturation are capable of undergoing the so-called oxidative "drying" reaction upon exposure of said hydrocarbons in a thin film to atmospheric oxygen. One specific source of such hydrocarbons possessing drying oil properties is the so-called unsaturated conjunct polymers recovered from the sludge-like product formed in a conjunct polymerization reaction as provided in the art and hereinafter briefly described. It is also known that one of the primary faults of said unsaturated conjunct polymers as drying oils is their tendency to form brittle films upon drying and their relatively poor color stability and weathering resistance. These deficiencies which limit the use of such hydrocarbons as drying oils in paints, varnishes and lacquer compositions are believed to be due to inherent faults in the structure and composition of said oils, particularly their highly unsaturated structure of which a large number of the unsaturated bonds present in said hydrocarbons are in conjugated relationship to each other and, further, the tendency of the unsaturated carbon atoms constituting the conjugated double bond system to form the generally unstable peroxidic type linkage upon atmospheric oxidation, which accounts for the observed tendency of the dried films to undergo embrittlement upon ageing, discoloration, and other undesirable physical and chemical transformation for drying oil purposes. In the process of the present invention, the unsaturated conjunct polymer starting material is reacted with formic acid to thereby reduce the number of conjugated double bonds, reaction conditions being controlled to eliminate a predetermined number of such double bonds and produce a compound having enhanced drying properties.

The reaction involved in the present process is believed to be essentially one of partial hydrogenation of the unsaturated conjunct polymers at the expense of the formic acid which decomposes under the reaction conditions provided herein, the liberated hydrogen preferentially attacking a pair of conjugated double bonds of the primary conjunct polymer hydrocarbon reactant. Upon the selection of suitable reaction conditions and particularly the proportion of formic acid to unsaturated conjunct hydrocarbon polymer reactants, the reaction, although progressing quite readily, can be controlled such that all unsaturated bonds of the original conjunct polymer molecule which contains from about 2.5 to about 4 of said double bonds are not subjected to hydrogenation and the resulting hydrocarbon product retains a residue of unsaturation which enables the product to undergo polymerization and oxidation reactions deemed to be essential to the formation of a dry film upon oxidative drying. The net effect, therefore, of the conversion reaction involved in the present process is to provide a product of less total unsaturation, the extent of which may be determined by the reaction conditions and the proportions of the reactants involved.

One embodiment of the present invention concerns a process for reducing the color and modifying the drying properties of a mixture of polyolefinic, cyclic hydrocarbons which comprises reacting said hydrocarbons with formic acid containing at least 50% by weight of said acid.

In one of its more specific embodiments, the present invention relates to a process which comprises reacting a conjunct polymer hydrocarbon fraction having a boiling point of at least 300° C. separated from a mixture of polyolefinic, cyclic hydrocarbons formed in a conjunct polymerization reaction with a formic acid reagent containing from about 80 to about 90% of said formic acid at a temperature of from about 80 to about 200° C. and at a pressure sufficient to maintain at least a portion of the reactants in liquid phase.

Other embodiments of the invention relating to specific charging stocks, reaction conditions and means for conducting the reaction as well as isolating the product are referred to in greater detail in the following further description of the invention.

The primary reactant or starting material involved in the present process and subject to modification by reaction with the formic acid reactant is characterized as a mixture of unsaturated conjunct polymers comprising hydrocarbons containing multiple olefinic double bonds, in conjugated as well as non-conjugated relationship to each other, the hydrocarbons being of relatively high molecular weight above about 250 and usually of monocyclic structure.

One of the preferred sources of the unsaturated conjunct polymers are the catalyst-hydrocarbon sludges recovered from certain hydrocarbon conversion processes, such as the sludge formed in the alkylation, polymerization, and isomerization of aliphatic unsaturated hydrocarbons utilizing catalysts capable of causing conjunct polymerization between the hydrocarbon reactants charged to the conversion process. Typical of such catalysts which form a sludge in the presence of aliphatic, unsaturated hydrocarbons are the various anhydrous Friedel-Crafts metal halide catalysts, such as aluminum chloride and aluminum bromide, and certain members of the general group of acid type catalysts, such as concentrated sulfuric acid, substantially anhydrous hydrogen fluoride and boron trifluoride as well as others generally known to the art. The above catalysts when contacted with a reactive, generally a non-aromatic hydrocarbon, such as a mono- and/or polyolefinic hydrocarbon containing at least three carbon atoms per molecule, or a branched chain paraffinic hydrocarbon at reaction conditions resulting in conjunct polymerization, produce a catalyst-hydrocarbon-containing sludge as a distinct reaction product of the process. Conjunct polymerization occurs in the mixture of catalyst and hydrocarbons by virtue of substantially simultaneous polymerization, cyclization, and hydrogen transfer reactions between the hydrocarbons to form relatively saturated conjunct polymers as one reaction product and an accompanying product comprising high molecular weight cyclic compounds referred to herein and in the art generally as unsaturated conjunct polymers, which combine with the catalyst in definite molecular ratios to form addition complexes and dissolve in an excess of the catalyst, the aggregate being a viscous liquid material referred to as a sludge.

The unsaturated conjunct polymers may be recovered from the sludge by any of several alternative procedures, as for example, by thermal decomposition of the addition complexes, by hydrolyzing the complexes in the presence of water or a weak solution of caustic, or they may be recovered by extraction or displacement with a solvent or a more reactive material which combines with the catalyst and displaces the unsaturated conjunct polymers from the sludge. It is not considered essential for an understanding of the present process to describe in detail the methods of preparing the sludge or recovering the unsaturated conjunct polymers, but the conjunct polymerization process relative to the use of substantially anhydrous hydrogen fluoride as catalyst therefor will be referred to in the examples hereinafter specified.

Typical unsaturated conjunct polymers comprise a mixture of hydrocarbons of generally homologous structure, the lower boiling point fractions of which are monocyclic hydrocarbons and the higher boiling components being polycyclic, generally bicyclic, in structure. The lower boiling point fractions contain a cyclopentenyl nucleus substituted on the nuclear positions of the cyclic ring, by alkyl, alkenyl, or alkapolyenyl side chains, the particular substituents depending upon the chain length thereof as determined by the particular fractions from which they are segregated. Infrared and ultraviolet absorption studies, as well as other analytical data, determined on the recovered unsaturated conjunct polymers have shown that although the conjunct polymer hydrocarbons are cyclic, they are substantially non-aromatic in structure and that the alkyl, alkenyl, and alkapolyenyl side chains on the cyclic nucleus are highly substituted with other alkyl groups, making the side chains highly branched. Typical hydrocarbons present in the mixture of unsaturated conjunct polymers recovered from the sludge appear to have the following structural formula:

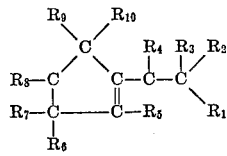

in which $R_1$ to $R_{10}$ are hydrogen or hydrocarbon radicals selected from the group consisting of alkyl, alkenyl, and alkapolyenyl radicals, and at least four of the groups $R_5$—$R_{10}$ are hydrocarbon radicals situated on different carbon atoms of the cyclopentyl nucleus. The preferred fractions for utilization as charging stocks in the present process have a boiling range of from about 200° to about 350° C., although the invention is likewise operable when utilizing other fractions, or the entire boiling range mixture of unsaturated conjunct polymers.

Formic acid utilized as a reactant in the present process to effect a reduction in the number of olefinic bonds of the polyolefinic cyclic charging stock is utilized in concentrations of at least 50% by weight of formic acid and, preferably, in concentrations of from about 80 to about 90% by weight. The quantity of formic acid employed in the reaction, as well as other factors effecting the product obtained in the process, such as temperature, duration of the reaction, etc., determines the number of double bonds in the hydrocarbon charging stocks reduced during the process and the drying properties of the ultimate product. It is generally preferred to charge from about 0.5 to about 5 molecular proportions of formic acid to polyolefinic, cyclic hydrocarbon charging stock. The particular proportion utilized will also depend upon the molecular weight of the hydrocarbon reactant and in some instances, especially when a saturated or nearly saturated hydrocarbon product is desired, the proportion of formic acid to hydrocarbons charged may be as high as 10 to 1, since the number of double bonds in the hydrocarbon reactant increases as the boiling point (and therefore the molecular weight as well) of the fraction selected increases. The lower boiling point fractions of the mixture of conjunct polymers or polyolefinic, cyclic hydrocarbons, for example, contain a fewer total number of double bonds than the higher boiling point fractions, such that a larger proportion of formic acid is required to obtain a product having the same ultimate number of unsaturated bonds as would be obtained from a lower boiling point fraction. In order to control the rate of reaction, the reactants may be mixed or dissolved in an inert diluent, such as a liquid paraffinic or aromatic hydrocarbon. In conducting the reaction, the formic acid is preferably added to the hydrocarbon reactant at a relatively low temperature and the resulting mixture thereafter stirred or otherwise agitated to effect an intimate admixture of the reactants as the temperature of the mixture is increased to the reaction point. The desired reaction occurs within a temperature range of from about 80° to about 200° C., preferably from about 100° to about 150° C. The reaction is desirably effected at superatmospheric pressures, preferably above about 10 atmospheres to maintain the reaction mixture in substantially liquid phase. For this purpose, an inert gas, such as propane, butane, nitrogen, carbon monoxide, carbon dioxide, hydrogen, etc., may be compressed into the reactor, the reaction being effected in a pressure autoclave type of reaction vessel which may be stirred or rotated to obtain the desired intimate dispersion of the reactants. Upon the attainment of equilibrium conditions in the reaction mixture, the reaction may be allowed to continue until the desired reduction in the number of olefinic double bonds of the hydrocarbon product is obtained, as determined by periodic sampling of the reaction mixture. The product may be recovered from the reaction mixture by a simple fractional distillation or by decanting the hydrocarbon layer from the resulting aqueous phase present in the reaction mixture.

The products of this process are nearly colorless to water-white liquid hydrocarbons and except for the completely saturated product obtained upon extended reaction periods or from conversion reactions wherein a large molecular proportion of formic acid to hydrocarbon charging stock is utilized, the products have improved drying oil properties when exposed in a thin film to atmospheric oxygen. The reduction in the total unsaturation of the hydrocarbons, and particularly, the conjugated double bonds present in the original polyolefinic cyclic hydrocarbon charging stock, produces a drying oil capable of forming colorless, tough, adherent films upon drying which, further, are non-tacky, have superior weathering qualities and do not yellow upon ageing as compared to the generally inferior standing with respect to these properties of the original polyolefinic, cyclic hydrocarbon starting material. The more or less completely saturated hydrocarbon product obtained upon deep-seated reduction in the number of olefinic double bonds of the charging stock are utilizable as chemical intermediates, as plasticizers in rubber and plastic compositions, etc.

The invention will be further described in greater detail with reference to specific reactions and particular procedures in the following examples, although said examples are not to be construed as limiting the generally broad scope of the invention in strict accordance therewith.

EXAMPLE I

A hydrogen fluoride sludge was prepared by reacting liquefied, substantially anhydrous hydrogen fluoride with an olefinic codimer gasoline having an initial boiling point of about 45° C., an end boiling point of about 266° C., and a bromine number of 116. Two liters of the gasoline fraction was added gradually with stirring to 600 grams of liquefied hydrogen fluoride in a closed, stirred pressure autoclave. Stirring was continued for approximately one hour at a temperature of about 90° to about 95° C., and at a pressure of about 205 pounds per square inch gauge, followed by cooling the reactor and its contents to approximately 0° C. in an ice bath. The liquid product separated into two layers on standing, an upper, substantially saturated hydrocarbon phase which was removed by decantation, and a lower layer containing substantially all of the hydrogen fluoride charged to the reaction. The lower hydrogen fluoride sludge phase was a fluid, homogenous, straw-colored liquid.

In order to decompose the HF-hydrocarbon addition complexes contained in the sludge and recover the polyolefinic, cyclic hydrocarbon therefrom, the sludge was gradually run into a hydrolyzing vessel containing twice its volume of cracked ice and water. The sludge hydrolyzing reaction was exothermic and resulted in the liberation of a hydrocarbon phase which collected as an upper layer in the hydrolyzing vessel above a lower dilute aqueous solution of hydrofluoric acid. The resulting hydrocarbon layer was decanted, shaken with a dilute, aqueous solution of sodium hydroxide to neutralize any residual hydrofluoric acid therein, decanted from the aqueous phase and dried. The mixture of hydrocarbons thus recovered had the following properties:

Table I

| | |
|---|---|
| Average molecular weight, cryoscopic | 290 |
| Bromine number | 118 |
| Diene number | 82 |
| Density, at 20° C. | 0.859 |
| Refractive index, $n_D^{20}$ | 1.4846 |
| Gardner color | 11–12 |
| Boiling range, ° C. | 170–450 |
| No. of double bonds per molecule, average | 3.2 |

The above mixture of polyolefinic, cyclic hydrocarbons was fractionally distilled to separate a fraction therefrom boiling from about 220° to about 325° C. and utilized in the following reaction.

A fraction of the above prepared unsaturated conjunct polymers having a boiling range of from about 220° to about 325° C., separated from the total product of the conjunct polymerization reaction by fractionation was reacted with formic acid in the following experiment. The unsaturated conjunct polymer fraction had a maleic anhydride value of 98, a bromine number of about 184 and contained about 3.5 double bonds per molecule. The fraction had a slight yellowish to tan coloration and dried upon exposure to air to a hard brittle film which readily checked when exposed to accelerated weathering conditions in a standard Weatherometer procedure. 50 grams of the above unsaturated conjunct polymer fraction (approximately 0.20 mole) was mixed with 50 grams of 90% formic acid (approximately 1 mole) and heated at the reflux temperature of the mixture (approximately 105° C.) for approximately two hours. The resulting mixture was separated into two phases upon standing, by decanting the upper predominantly hydrocarbon phase from the lower aqueous phase. The hydrocarbon product was water-white and approximately 50 grams was recovered from the reaction mixture. It had no maleic anhydride value and its bromine number was substantially zero. When spread as a thin film and exposed to the atmosphere, it evaporated without drying.

A similar experiment utilizing the same relative proportions of unsaturated conjunct polymers and formic acid of the same concentration but heated to a temperature of 120° C. in a rotating autoclave for six hours yielded a hydrocarbon product having similar properties.

EXAMPLE II

A fraction of unsaturated conjunct polymers prepared as in Example I and having a boiling range of from about 325° to about 400° C. was utilized in the following experiments. 50 grams of the above boiling range fraction is mixed with 10 grams of 90% formic acid in a rotating pressure autoclave at 140° C. for six hours, the autoclave being pressured to approximately 50 atmospheres of nitrogen before starting the reaction. The hydrocarbon product separated from the resulting aqueous phase in the product is a water-white material having a maleic anhydride value of less than 1 and a bromine number of approximately 46. The material dries upon exposure in a thin film to atmospheric oxygen to a tough, resilient film which has good weathering properties.

EXAMPLE III

A fraction of unsaturated hydrocarbon conjunct polymers having a boiling range of from about 325° to about 400° C. may be reacted with 3 molar proportions of 90% formic acid in accordance with the conditions specified in Example II to form a substantially saturated hydrocarbon product which is non-volatile, but which does not dry upon exposure to atmospheric oxygen. It may be utilized as a plasticizer in rubber compositions.

I claim as my invention:

1. A process for reducing the color and unsaturation of a conjunct polymer mixture of polyolefinic, cyclic hydrocarbons containing from about 2.5 to about 4 double bonds per molecule which comprises reacting said hydrocarbons with formic acid at a temperature of from about 80° C. to about 200° C.

2. The process of claim 1 further characterized in that said reaction is effected at a temperature of from about 100° C. to about 150° C.

3. The process of claim 1 further characterized in that the concentration of said formic acid is from about 80 to about 90% by weight thereof.

4. The process of claim 1 further characterized in that from about 0.5 to about 5 moles of formic acid per mol of polyolefinic, cyclic hydrocarbons is utilized in said reaction.

5. The process of claim 1 further characterized in that said conjunct polymer mixture boils between about 200° C. and about 350° C.

6. The process of claim 1 further characterized in that said conjunct polymer mixture boils between about 325° C. and 400° C.

LOUIS SCHMERLING.

No references cited.